(12) United States Patent
Braeuchle et al.

(10) Patent No.: US 7,765,066 B2
(45) Date of Patent: Jul. 27, 2010

(54) METHOD AND DEVICE FOR LANE KEEPING SUPPORT IN MOTOR VEHICLES

(75) Inventors: Goetz Braeuchle, Reichartshausen (DE); Martin Heinebrodt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 59 days.

(21) Appl. No.: 10/512,593

(22) PCT Filed: Dec. 11, 2002

(86) PCT No.: PCT/DE02/04540

§ 371 (c)(1),
(2), (4) Date: May 11, 2005

(87) PCT Pub. No.: WO03/091813

PCT Pub. Date: Nov. 6, 2003

(65) Prior Publication Data

US 2005/0228588 A1  Oct. 13, 2005

(30) Foreign Application Priority Data

Apr. 23, 2002  (DE) ............................ 102 18 010

(51) Int. Cl.
  *B60W 30/12* (2006.01)
  *B62D 6/00* (2006.01)
  *G05D 3/12* (2006.01)
(52) U.S. Cl. .................. 701/301; 701/41; 701/116; 701/205; 382/103; 706/24
(58) Field of Classification Search ............... 701/301, 701/1, 96; 340/436, 903; 180/169; 348/118
  See application file for complete search history.

(56) References Cited

U.S. PATENT DOCUMENTS

| | | | | |
|---|---|---|---|---|
| 4,049,961 A | * | 9/1977 | Marcy | 250/202 |
| 4,401,181 A | * | 8/1983 | Schwarz | 180/168 |
| 4,970,653 A | * | 11/1990 | Kenue | 701/301 |
| 5,483,453 A | * | 1/1996 | Uemura et al. | 701/23 |
| 5,517,412 A | * | 5/1996 | Unoura | 701/23 |
| 5,555,312 A | * | 9/1996 | Shima et al. | 382/104 |
| 5,642,093 A | * | 6/1997 | Kinoshita et al. | 340/439 |
| 5,699,040 A | * | 12/1997 | Matsuda | 340/435 |
| 5,765,116 A | * | 6/1998 | Wilson-Jones et al. | 701/41 |
| 5,890,083 A | * | 3/1999 | Franke et al. | 701/45 |
| 5,926,117 A | * | 7/1999 | Gunji et al. | 340/988 |

(Continued)

FOREIGN PATENT DOCUMENTS

DE  10018873  12/2001

(Continued)

*Primary Examiner*—Jack W. Keith
*Assistant Examiner*—Jonathan M Dager
(74) *Attorney, Agent, or Firm*—Kenyon & Kenyon LLP

(57) ABSTRACT

Method for lane keeping support in motor vehicles, in which a setpoint value for the lateral position of the vehicle is determined, the actual position of the vehicle in relation to the boundaries of the lane in which the host vehicle is traveling is detected by a sensor device and an output signal for the lane keeping support is calculated by a setpoint-actual comparison, wherein objects are tracked in at least one neighboring lane and a setpoint value for the lateral position is varied as a function of tracking data of these objects.

18 Claims, 4 Drawing Sheets

U.S. PATENT DOCUMENTS

| | | | |
|---|---|---|---|
| 5,938,707 A * | 8/1999 | Uehara | 701/41 |
| 5,979,581 A * | 11/1999 | Ravani et al. | 180/168 |
| 5,999,874 A * | 12/1999 | Winner et al. | 701/93 |
| 6,057,754 A * | 5/2000 | Kinoshita et al. | 340/435 |
| 6,081,756 A * | 6/2000 | Mio et al. | 701/23 |
| 6,185,492 B1 * | 2/2001 | Kagawa et al. | 701/41 |
| 6,226,389 B1 * | 5/2001 | Lemelson et al. | 382/104 |
| 6,230,093 B1 * | 5/2001 | Michi et al. | 701/96 |
| 6,321,159 B1 * | 11/2001 | Nohtomi et al. | 701/207 |
| 6,343,247 B2 * | 1/2002 | Jitsukata et al. | 701/28 |
| 6,353,788 B1 * | 3/2002 | Baker et al. | 701/96 |
| 6,370,474 B1 * | 4/2002 | Hiwatashi et al. | 701/300 |
| 6,373,378 B1 * | 4/2002 | Ewerhart et al. | 340/425.5 |
| 6,385,539 B1 * | 5/2002 | Wilson et al. | 701/213 |
| 6,473,678 B1 * | 10/2002 | Satoh et al. | 701/41 |
| 6,487,501 B1 * | 11/2002 | Jeon | 701/301 |
| 6,571,176 B1 * | 5/2003 | Shinmura et al. | 701/301 |
| 6,580,987 B2 * | 6/2003 | Sadano et al. | 701/41 |
| 6,614,469 B1 * | 9/2003 | Kato et al. | 348/148 |
| 6,691,003 B1 * | 2/2004 | Stortz et al. | 701/1 |
| 6,772,062 B2 * | 8/2004 | Lasky et al. | 701/207 |
| 6,803,736 B1 * | 10/2004 | Hommel et al. | 318/567 |
| 6,937,165 B2 * | 8/2005 | Rogers | 340/963 |
| 6,944,543 B2 * | 9/2005 | Prakah-Asante et al. | 701/301 |
| 6,977,630 B1 * | 12/2005 | Donath et al. | 345/7 |
| 7,124,027 B1 * | 10/2006 | Ernst et al. | 701/301 |
| 7,375,728 B2 * | 5/2008 | Donath et al. | 345/427 |
| 7,510,038 B2 * | 3/2009 | Kaufmann et al. | 180/169 |
| 2001/0018641 A1 * | 8/2001 | Kodaka et al. | 701/301 |
| 2002/0007239 A1 * | 1/2002 | Matsumoto et al. | 701/41 |
| 2002/0080019 A1 * | 6/2002 | Satoh et al. | 340/436 |
| 2002/0138193 A1 * | 9/2002 | Miyahara | 701/96 |
| 2002/0184236 A1 * | 12/2002 | Donath et al. | 707/104.1 |
| 2002/0198632 A1 * | 12/2002 | Breed et al. | 701/1 |
| 2003/0045982 A1 * | 3/2003 | Kondo et al. | 701/41 |
| 2003/0062769 A1 * | 4/2003 | Matsumoto et al. | 303/146 |
| 2003/0109980 A1 * | 6/2003 | Kojima et al. | 701/96 |
| 2003/0128182 A1 * | 7/2003 | Donath et al. | 345/156 |
| 2004/0090117 A1 * | 5/2004 | Dudeck et al. | 303/191 |
| 2004/0143381 A1 * | 7/2004 | Regensburger et al. | 701/36 |
| 2005/0174223 A1 * | 8/2005 | Egami et al. | 340/440 |

FOREIGN PATENT DOCUMENTS

| | | |
|---|---|---|
| EP | 806336 | 11/1997 |
| JP | 2001-039326 | 2/2001 |
| JP | 2001-048036 | 2/2001 |

* cited by examiner

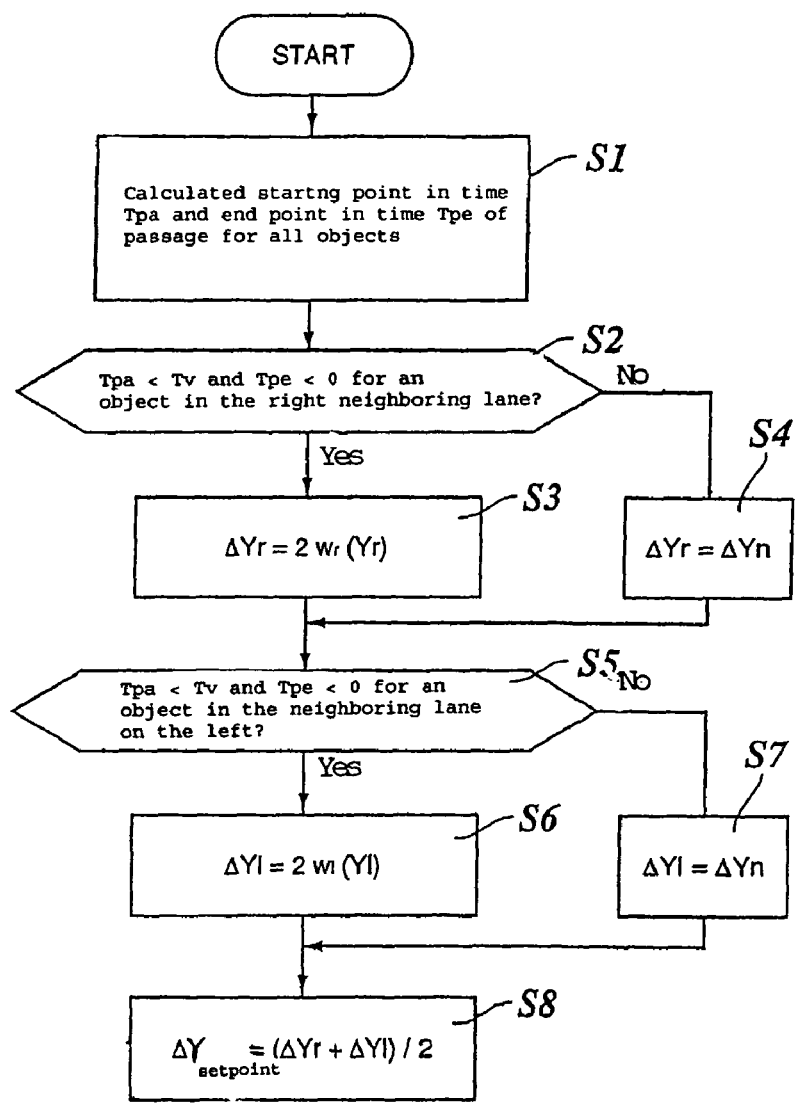
*Fig. 3*
*Fig. 4*
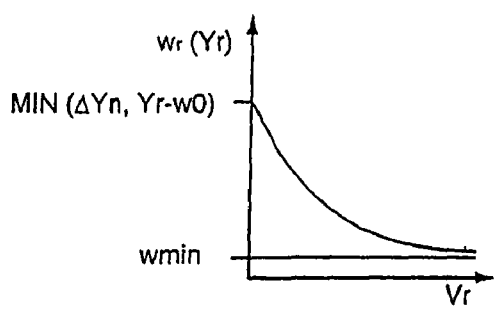
*Fig. 5*
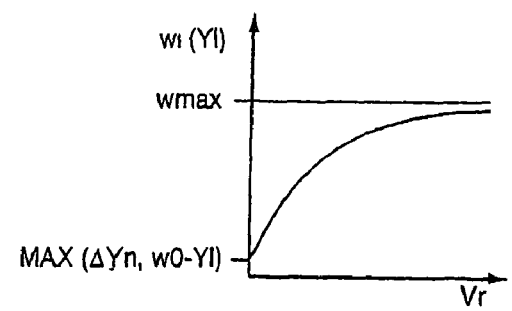

METHOD AND DEVICE FOR LANE KEEPING SUPPORT IN MOTOR VEHICLES

FIELD OF THE INVENTION

The present invention relates to a method for lane keeping support in motor vehicles, in which a setpoint value for the lateral position of the vehicle is determined, the actual position of the vehicle is detected by a sensor device in relation to the boundaries of the lane in which the vehicle is traveling and an output signal for the lane keeping support is calculated by a setpoint/actual comparison. The present invention also relates to a device for performing this method.

BACKGROUND INFORMATION

Systems which support the driver in driving the vehicle or which facilitate special driving maneuvers (advanced driver assistance systems; ADAS) are being used to an increasing extent in motor vehicles. Lane keeping support (LKS) is a function of these systems in which the actual position of the vehicle is determined in relation to the lane in which the vehicle is traveling and is compared with a setpoint value which typically corresponds to the center of the lane. The output signal is then composed of an actuator signal for an actuator which intervenes in the steering system of the vehicle, whether to support the driver by providing additional steering torque or to perform a completely autonomous lane keeping maneuver which does not require any intervention on the part of the driver.

SUMMARY

An object of the present invention is to provide a method for lane keeping support which will correspond largely to the typical driving behavior of drivers.

This object may be achieved according to the present invention in that objects in at least one neighboring lane are tracked and the setpoint value of the lateral position is varied as a function of the tracking data of these objects.

It is consistent with the natural intuitive performance of a driver not to stay in the center of the lane in which he is driving but instead to change positions in the lane depending on the traffic situation. For example, many drivers tend to drive slightly to the left of the center of the lane when passing a slower vehicle in the neighboring lane on the right in order to thereby allow a greater safety distance from the vehicle being passed. Likewise many drivers tend to drive slightly to the right of the center of the lane when they are being passed or when a vehicle is approaching from the opposite direction if the oncoming lane is not separated from the host vehicle's lane by guardrails or the like, e.g., in construction areas on highways. The example method according to the present invention simulates this natural behavior of drivers. This not only yields an actual increase in driving safety but in particular it also takes into account the driver's feeling of safety and thus increases the driver's comfort as well as increasing the confidence of the driver and the occupants of the vehicle in the ADAS system, which consequently increases the acceptance of such systems.

Performing this example method requires an object detection device capable of supplying tracking data regarding the objects in the neighboring lanes. However, the required hardware for such an object detection device is usually available anyway in vehicles having ADAS systems. For example, the sensor device which is used for determining the actual position of the vehicle in relation to the boundaries of the lane is frequently a camera system, e.g., one or more video cameras in combination with a (stereo) image processing system. In this case the tracking data regarding objects in neighboring lanes may also be supplied by the image processing system.

Generally, in addition to the lane keeping system, the ADAS system also includes another subsystem for the longitudinal guidance support, e.g., in the form of an ACC system (adaptive cruise control). As part of such a system, the distances and relative speeds of vehicles traveling ahead in the host vehicle's lane and also in neighboring lanes are detected with the help of a direction-sensitive distance sensor, e.g., a radar sensor or a lidar sensor, and the speed of the host vehicle is automatically adjusted, so that the vehicle traveling directly in front is followed at an appropriate safety distance. For tracking objects in neighboring lanes, the signals of such a distance sensor may be used—in combination with the data supplied by the image processing system, if necessary. The relative speeds of oncoming vehicles or vehicles traveling in front are directly measurable with the help of a distance sensor in particular, so the traffic situation may be extrapolated on the basis of the measured relative speeds extrapolated into the future very easily and precisely, so that "evasive maneuvers" to be performed by the method according to the present invention may be initiated in a timely manner.

If the traffic behind the host vehicle is also observed with the help of the camera system and/or with the help of a rearview radar or all-round radar, then it is also possible to take into account passing maneuvers of following vehicles in a timely manner.

The extent of the shift in the setpoint value from the center of the lane, i.e., the ideal line, preferably depends on one or more of the following parameters: lateral distance from the object tracked in the neighboring lane, the size and type of this object, the position of the object in the right or left neighboring lane, the object distance along the lane, the speeds of the host vehicle and the object detected, i.e., the relative speed of the object, and the width of the lane. If necessary, visibility and weather conditions may also be taken into account. For example, if the road is wet, a greater lateral offset might be preferably selected to prevent impaired visibility due to the splash thrown up by vehicles in neighboring lanes. The visibility and weather conditions as well as similar parameters may be detected either automatically or on command by the driver.

It is also possible for the driver to have the option to select a certain setpoint lateral offset of the host vehicle from the center of the lane, e.g., to be able to see better past any lead vehicles regardless of the presence of objects in the neighboring lanes. In this case, the "normal" lateral offset selected by the driver is also taken into account in determining the setpoint value for the lateral position as a function of objects in the neighboring lanes.

The parameters which determine the precise response of the vehicle to objects located in the neighboring lanes are also influenceable within certain limits, taking into account safety aspects, through suitable configuration commands by the driver.

According to a refinement of the present invention, it is also possible to implement this method as an adaptive system which automatically adapts to the driver's performance. This is true in particular for the case of lane keeping support in the actual sense, i.e., for the case when the driver himself retains control of the steering system and the actuator of the lane keeping system intervenes merely as a supportive measure by injecting a supplementary steering torque into the steering. In this case, the driver is able to override the automatic lane keeping by "countersteering" or "holding." The extent of "holding" by the driver then forms a feedback signal which makes it possible to automatically adapt the behavior of the lane keeping system to the intents and preferences of the driver.

Lane keeping systems are frequently designed to allow a certain cutting of the turn when negotiating turns. This may be done, for example, by calculating an ideal line which deviates from the center of the lane and/or by calculating a setpoint value for the lateral position (corresponding to the center of the lane or the ideal line) for a certain point which is situated at a speed-dependent distance ahead of the current position of the vehicle. This distance (predicted distance) is often indicated in the form of a time interval (predicted time), which is given by the quotient of the predicted distance and the absolute speed of the vehicle. Intervention in the steering is then performed by making the actual value for the lateral position of the vehicle within the predicted time match the setpoint value. When negotiating turns, this regulated behavior necessarily results in the turns being cut to some extent, which depends on the predicted distance. In the method according to the present invention, the setpoint value for the lateral position and/or the predicted distance should be adjusted so that when there is oncoming traffic or when vehicles are in the left neighboring lane, turn cutting is suppressed for left turns, and similarly, when there are vehicles in the right neighboring lane, turn cutting is suppressed for right turns.

An exemplary embodiment is explained in greater detail below with reference to the figures.

BRIEF DESCRIPTION OF THE DRAWINGS

FIG. 3 shows a flow chart of the example method according to the present invention.

FIGS. 4 and 5 show examples of weighting functions which are used in the example method according to FIG. 3.

DETAILED DESCRIPTION OF EXAMPLE EMBODIMENTS

Figure 1:
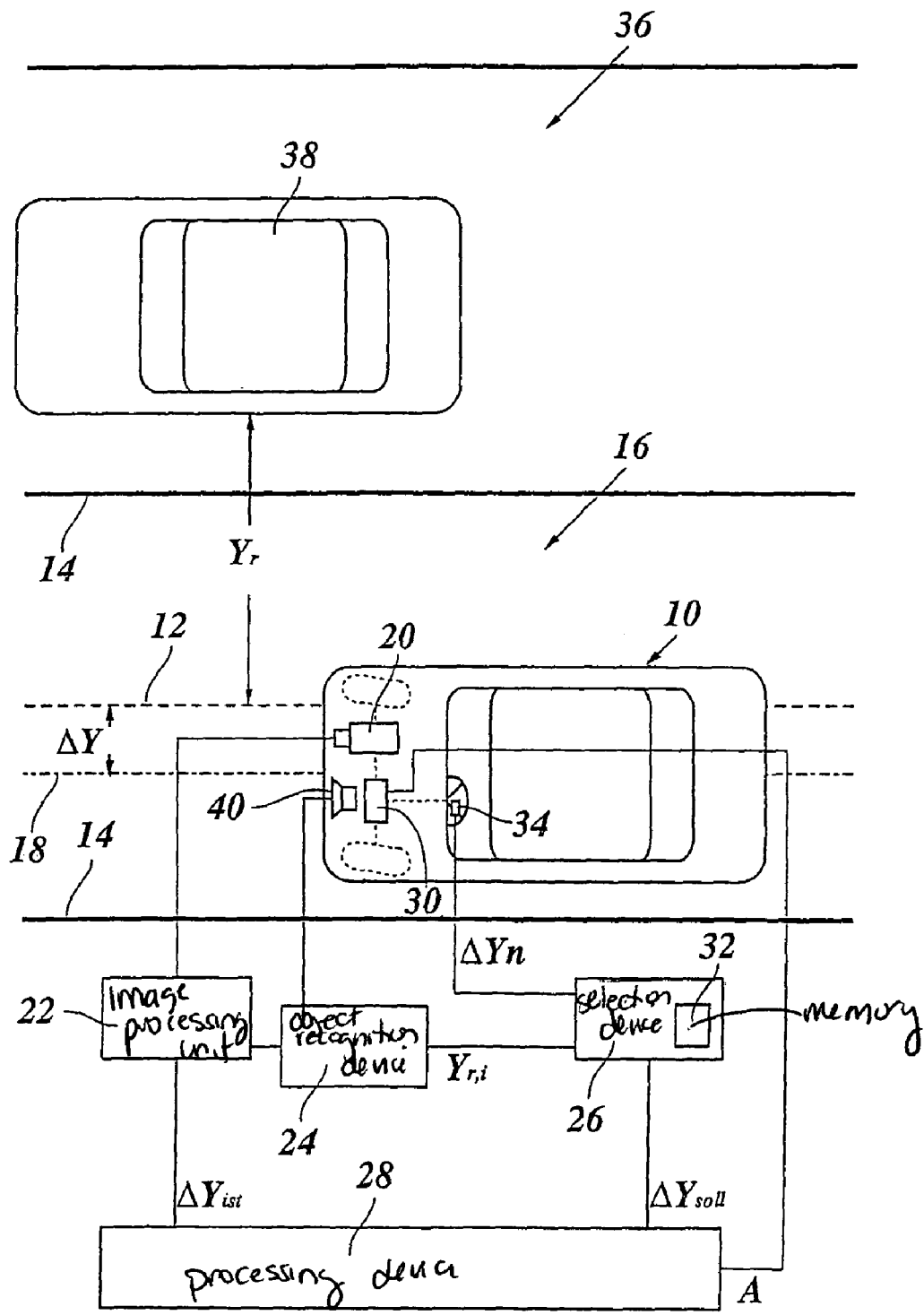
FIG. 1 shows a block diagram of a lane keeping system for a motor vehicle.

FIG. 1 shows schematically a top view of a motor vehicle 10 which is traveling in a lane 16 of a multilane road defined by boundaries 14 with a slight lateral offset from center 12 of the lane. Longitudinal axis 18 of motor vehicle 10 is shown with a dash-dot line, and the lateral deviation between longitudinal axis 18 and center 12 of the lane is labeled as $\Delta Y$.

Motor vehicle 10 is equipped with an ADAS system, which includes as a subsystem a lane keeping system having the following components, depicted in the form of a block diagram: a sensor device which includes a video camera 20 and an image processing unit 22, an object recognition device 24, a selection device 26 for selecting a setpoint value $\Delta Y_{setpoint}$ for the lateral position of motor vehicle 10, a processing device 28 and a steering actuator 30 which is triggered by an output signal A of processing device 28 and intervenes in the vehicle steering to regulate the lateral position of motor vehicle 10 at the setpoint value.

In the example shown here, the actual position of the vehicle in the direction across longitudinal axis 18 is detected using the sensor device formed by video camera 20 and image processing unit 22. Image processing unit 22 therefore analyzes the video image recorded by the camera to recognize boundaries 14 and the position of motor vehicle 10 in relation to these boundaries. This embodiment of the sensor device is to be understood only as an example and may be replaced by magnetic sensors, for example, which detect magnetic markers as the boundaries of the road. Likewise, the boundaries of the road could also be marked by reflectors detected by a radar system of the vehicle.

If the position of two boundaries 14 in relation to motor vehicle 10 is known, then the width of lane 16 and the location of center 12 of the lane may also be determined from this data. The sensor device is therefore able to relay to processing device 28 the actual position of motor vehicle 10, expressed by an actual value $\Delta Y_{actual}$ of lateral deviation $\Delta Y$. On the basis of a comparison of actual value $\Delta Y_{actual}$ with setpoint value $\Delta Y_{setpoint}$, processing device 28 then forms output signal A, which is sent to steering actuator 30. Setpoint value $\Delta Y_{setpoint}$ is also expressed as a lateral deviation from center 12 of the lane. For example, positive values of $\Delta Y_{setpoint}$ correspond to a deviation from center 12 of the lane to the right and negative values correspond to a deviation from the center of the lane to the left.

Selection device 26 includes a memory 32 in which a normal value $\Delta Y_n$ of the setpoint value desired by the driver is stored. Selection device 26 also includes a setting element 34 on the steering wheel of the vehicle using which the stored normal value is variable. In this way the driver of vehicle 10 is able to select lateral deviation $\Delta Y$ individually according to his own personal preferences or needs. However, selection device 26 may be designed to modify the setting made by the driver or to limit the range of settings. For example, it is expedient to limit the setting range as a function of the width of the lane measured with the help of the sensor device and as a function of the known width of the vehicle, so the vehicle always maintains an adequate safety distance from the boundaries of the lane. It is also possible for the setting performed with the help of setting element 34 not to give lateral deviation $\Delta Y$ in a fixed unit of length but instead as a percentage based on the width of the lane or on the excess width of the lane, i.e., the difference between the width of the lane and the width of the vehicle. In this case, the setpoint value stored in memory 32 would be adapted automatically when the width of the lane changes without the driver having to adjust setting element 34.

Object recognition device 24, which is shown as a separate block in FIG. 1, is part of image processing unit 22, which is designed specifically for recognizing objects in neighboring lanes next to lane 16 on which host vehicle 10 is traveling. FIG. 1 shows a right neighboring lane 36 in which another vehicle as object 38 is traveling. Object recognition device 24 extracts from the video image tracking data for object 38 which includes in particular the position of this object plus, if necessary, its type and size. Among other things, this tracking data includes lateral distance $Y_r$ of object 38 from center 12 of lane 16. In the example shown here, $Y_r$ denotes the smallest lateral distance for objects in right neighboring lane 36, i.e., the distance between center 12 of the lane and the left vehicle boundary of object 38.

In addition, information regarding the longitudinal position of object 38 along lane 36 and regarding the relative speed of object 38 in relation to vehicle 10 may also be extracted from the video image. In the example shown here, however, vehicle 10 is additionally equipped with a radar sensor 40. This radar sensor 40 is used primarily for detecting lead vehicles in lane 16 and for regulating the distance as part of a longitudinal guidance system. However, it may also supply information regarding objects in neighboring lanes, in particular regarding the longitudinal distance and relative speed of these objects, as well as, given adequate angular resolution, lateral distance $Y_r$. By comparing the information supplied by video camera 20 and radar sensor 40, the accuracy and reliability of the tracking may be improved. If object 38 enters the blind spot of video camera 20 and radar sensor 40 in a passing maneuver, the tracking data for the object may be extrapolated on the basis of the relative speed under the assumption that object 38 is remaining in its lane position in neighboring lane 36. To improve object tracking, additional sensor components may optionally be provided, e.g., additional video cameras, an all-round radar and the like.

Similarly, objects in a left neighboring lane (not shown in FIG. 1) may also be tracked with the help of the tracking system. If multiple objects are being tracked, object recognition device 24 supplies a set of tracking data including lateral distances $Y_{r,i}$ to selection device 26 for each object detected. On the basis of this tracking data, selection device 26 calculates setpoint value $\Delta Y_{setpoint}$ for the lateral position of vehicle 10. If necessary, normal value $\Delta Y_n$ stored in memory 32 is modified so that when passing object 38, a greater safety distance from this object is maintained.

Figure 2:
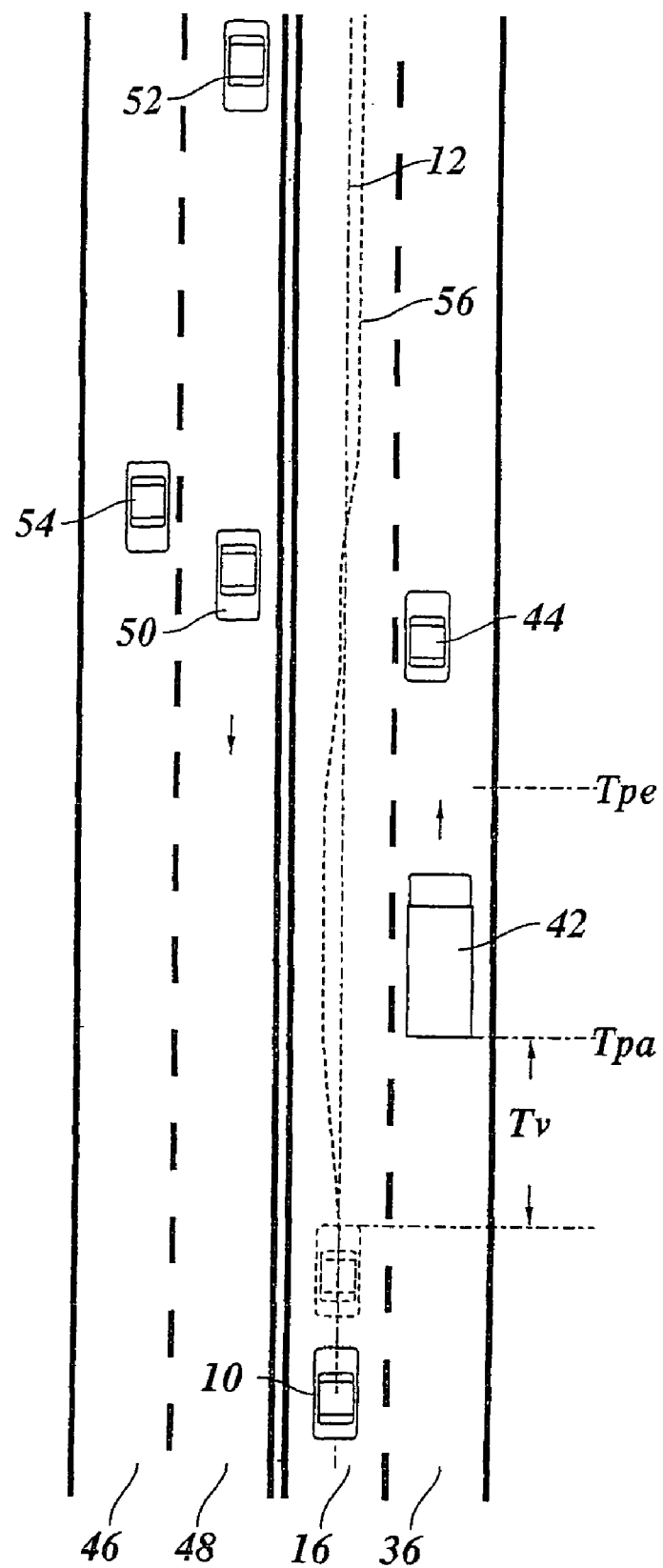
FIG. 2 shows a diagram to illustrate the principles of an example method according to the present invention.

This adaptation of the setpoint value and the resulting vehicle performance is illustrated in FIG. 2 on the basis of an example.

FIG. 2 shows motor vehicle 10 in lane 16 and a truck 42 and a passenger vehicle 44 as objects in neighboring lane 36 on the right. In addition, FIG. 2 shows two lanes 46 and 48 of oncoming traffic. Lane 48 directly adjacent to lane 16 is delimited from lane 16 only by a lane marker and is regarded here as a neighboring lane. In the example shown here, two passenger vehicles are traveling on it, these vehicles likewise being tracked by object recognition device 24 as objects 50, 52. However, a vehicle 54 traveling in lane 46 is no longer being tracked as a relevant object.

Center 12 of lane 16 is shown with a dash-dot line and the path of vehicle 10 is given as a dashed line, this path being determined by setpoint values $\Delta Y_{setpoint}$ which are determined periodically by selection device 26.

It is assumed here that normal value $\Delta Y_n$ has been set at 0 by the driver, i.e., the setpoint value corresponds to center 12 of the lane if there are no objects in neighboring lanes 36 and 48. When vehicle 10 approaches truck 42, $\Delta Y_{setpoint}$ becomes negative, i.e., the vehicle will travel slightly to the left of center 12 of the lane in order to maintain a greater safety distance from the truck. After passing truck 42, passenger vehicle 44 is passed next. However, the lateral offset of path 56 is then reduced almost to 0 again because object 50 is now approaching vehicle 10 from the opposite direction. Because of the much greater relative speed, a greater relative safety distance should be maintained with respect to the oncoming vehicle. Although passenger vehicle 44 has been passed, $\Delta Y_{setpoint}$ is positive, the host vehicle is traveling with a lateral offset to the right in relation to center 12 of the lane because neighboring lane 36 on the right is then free and a greater safety distance should be maintained from object 52, which in this case is an oncoming object.

According to one exemplary embodiment, the method for lane keeping support could take place approximately as follows. A certain predicted time $T_v$ is used as the basis for regulating the lateral position. Setpoint value $\Delta Y_{setpoint}$ is calculated in each case by selection device 26 for a point on road 16 which is reached by vehicle 10 after predicted time $T_v$. Output signal A is calculated by processing device 28 accordingly, so the setpoint-actual deviation within predicted time $T_v$ is reduced to 0.

For each tracked object 42, 44, 50, 52, selection device 26 calculates on the basis of the measured longitudinal distance and the relative speed of the object a point in time $T_{pa}$ when vehicle 10 will begin to pass the object in question. In the case of truck 42, $T_{pa}$ is the point in time when the front end of vehicle 10 reaches the rear edge of truck 42. Similarly, a point in time $T_{pe}$ when the passage of the object is concluded is calculated for each object. In the case of truck 42, this is the point in time when the rear bumper of vehicle 10 is level with the front bumper of truck 42. FIG. 2 shows the positions of the front bumper of vehicle 10 for points in time $T_{pa}$ and $T_{pe}$. Vehicle 10 is shown with a dashed line at the point in time when predicted time $T_v$ corresponds to calculated time $T_{pa}$ (however, truck 42 has not yet reached the position shown in FIG. 2 at this point in time but instead reaches this position only after predicted time $T_v$ has elapsed). When vehicle 10 has reached the position shown with the dashed line, selection device 26 calculates setpoint value $\Delta Y_{setpoint}$ taking into account truck 42. At this point in time the steering intervention is initiated on the basis of output signal A, causing the lateral position of vehicle 10 to correspond to the calculated setpoint value at point in time $T_{pa}$.

If vehicle 10 and truck 42 are level with one another, selection device 26 would calculate setpoint value $\Delta Y_{setpoint}$ for a point in time which is later by $T_v$. If passenger vehicle 44 were not present, the setpoint value would be returned to 0 at this point in time. The result would be that vehicle 10 would already be approaching truck 42 before the passing maneuver is in fact concluded. According to one example embodiment of the present invention, this is preventable by reducing predicted time $T_v$ to a smaller value—at least with respect to object 42 which is currently of relevance, so that the return to the center of the lane occurs later accordingly. However, the normal (longer) predicted time should remain in effect in consideration of other objects 44, 50 and 52. In a modified embodiment, the setpoint value calculated with respect to a certain object (i.e., truck 42 here) is retained until this object has in fact been passed, i.e., until time $T_{pe}$.

FIG. 3 shows a flow chart for this latter variant of the method, taking into account objects in both neighboring lanes 36 and 48.

The program routine illustrated by the flow chart in FIG. 3 is retrieved periodically at short intervals, e.g., every 10 ms. In step S1, points in time $T_{pa}$ and $T_{pe}$ (when the passage of the particular object begins and ends, respectively) are calculated for all objects tracked, i.e., for objects 42, 44, 50 and 52 in FIG. 2. In step S2, a check is performed to determine whether conditions $T_{pa} \leq T_v$ and $T_{pe} < 0$ are met for at least one object in the neighboring lane on the right. The first condition means that passage of the object will begin within time $T_v$. The second condition means that passage of the object is not yet concluded. If both conditions are met, setpoint value $\Delta Y_{setpoint}$ for the lateral position should consequently be calculated as a function of the tracking data of this object. Accordingly, in step S3 a value $\Delta Y_r$ is calculated, namely as a doubled function $w_r(Y_r)$ of lateral distance $Y_r$ of the particular object. Function value $w_r(Y_r)$ is a candidate for the setpoint value and would be accepted as the final setpoint value if that particular object were the only relevant object in the neighboring lane on the right.

If the conditions queried in step S2 for two objects are met in the neighboring lane on the right, step S3 is performed for both objects and then the smaller of the two resulting values is used for $\Delta Y$ (smaller values for the setpoint value correspond to a greater lateral offset to the left). This situation could occur, for example, when the passing maneuver for truck 42 is not yet concluded but passenger vehicle 44 is reached in less than time $T_v$.

If the conditions queried in step S2 are not met for any object in the right neighboring lane, then $\Delta Y_r$ is set at normal value $\Delta Y_n$ in step S4; depending on the driver's instructions, this normal value may be positive or negative corresponding to a desired deviation from the center of the lane to the right or left.

Subsequent steps S5, S6 and S7 are a repetition of steps S2-S4, but in this case for objects in the left neighboring lane. In step S6, doubled function value $w_l(Y_l)$ is calculated as a value $\Delta Y_l$, which is also a candidate for the setpoint value and forms the final setpoint value when only objects in the left lane are to be taken into account.

In step S8 final setpoint value $\Delta Y_{setpoint}$ is then calculated by forming the average of values $\Delta Y_r$ and $\Delta Y_l$. This setpoint value is then used as the basis for calculations in processing device 28.

It should first be assumed that $\Delta Y_n$ has been set by the driver at 0. In this case final setpoint value $\Delta Y_{setpoint}$ is equal to $w_r(Y_r)$ when only one relevant object has been located in the right neighboring lane and it is equal to $w_l(Y_l)$ when only one relevant object has been located in the left neighboring lane. If relevant objects have been located in both neighboring lanes, the final setpoint value represents a compromise between candidates $w_r(Y_r)$ and $w_l(Y_l)$. This compromise corresponds to path 56 in FIG. 2 with simultaneous passing of passenger vehicles 44 and 50.

If $\Delta Y_n$ is not equal to zero and the conditions queried in steps S2 and S5 are not met either for the right or left neighboring lanes, then final setpoint value $\Delta Y_{setpoint} = \Delta Y_n$, i.e., the lateral offset of the vehicle in relation to center 12 of the lane corresponds to the driver's intent. If only the query in step S2 or only the query in step S5 had a positive outcome, then the final setpoint value in step S8 will be modified slightly, i.e., by $\Delta Y_n/2$. This may be quite desirable to moderate excessive lateral movements of the vehicle. However, the program may optionally be modified so that $\Delta Y$ remains completely disregarded when one of the queries in step S or S5 has a positive outcome.

Functions $w_r$ and $w_1$ denote the setpoint value displacement as a function of relative speed $V_r$ of the particular object.

Examples of these functions are shown in FIGS. 4 and 5. The dependence on the relative speed takes into account the idea that the safety distance should be greater at a greater relative speed. As FIG. 4 shows, function $w_r(Y_r)$ begins at a certain (positive or negative) initial value (at $V_r=0$) and then approaches asymptotically a certain minimum value $w_{min}$. Value $w_{min}$ depends on the width of lane 16 and is selected so that the greatest possible distance from the object is maintained at a very great relative speed but without vehicle 10 leaving lane 16.

The initial value at relative speed 0 is given by MIN($\Delta Y_n$, $Y_r-w_0$), where $w_0$ is a minimum safety distance from the particular object; the distance should never be less than this minimum distance. If lateral distance $Y_r$ of the object in the neighboring lane on the right is very great, then the initial value is given $\Delta Y_n$, i.e., the object has no influence on the lateral offset desired by the driver. Only at a very low value of lateral distance $Y_r$ of the object is the initial value given by $Y_r-w_0$ and selected so that the object passes at least at a distance $w_0$. When the tracked object leaves the neighboring lane and changes to lane 16 in which the host vehicle is traveling, $Y_r-w_0$ assumes very small negative values and may even fall below $w_{min}$. In this case, safety distance $w_0$ may no longer be maintained and a collision warning should be output to the driver.

FIG. 5 shows function $w_l(Y_l)$ constructed according to similar principles for objects in the neighboring lane on the left. This neighboring lane on the left may be a lane of the road with traffic in the same direction or a lane of oncoming traffic (as in FIG. 2). In the latter case, relative speeds $V_r$ are higher in general.

Functions $w_r$ and $w_l$ may be stored as function specifications with suitable parameters, as tables or as characteristic maps in memory 32 of selection device 26. These functions may also depend on the absolute speed of vehicle 10, e.g., in such a way that the function values and thus the corresponding lateral offset of the vehicle are smaller in absolute value at higher absolute speeds, so that uncomfortably high transverse accelerations may be avoided when passing at a high speed.

If the driver intervenes manually in the steering to force a lateral offset from center 12 of the lane that is greater or smaller than the setpoint value calculated in step S8, then the parameters that determine functions $w_r$ and $w_l$ may be adapted so that the setpoint value calculated in step S8 corresponds to the driver's intent, which is discernible on the basis of the driver's steering maneuver.

Figure 6:
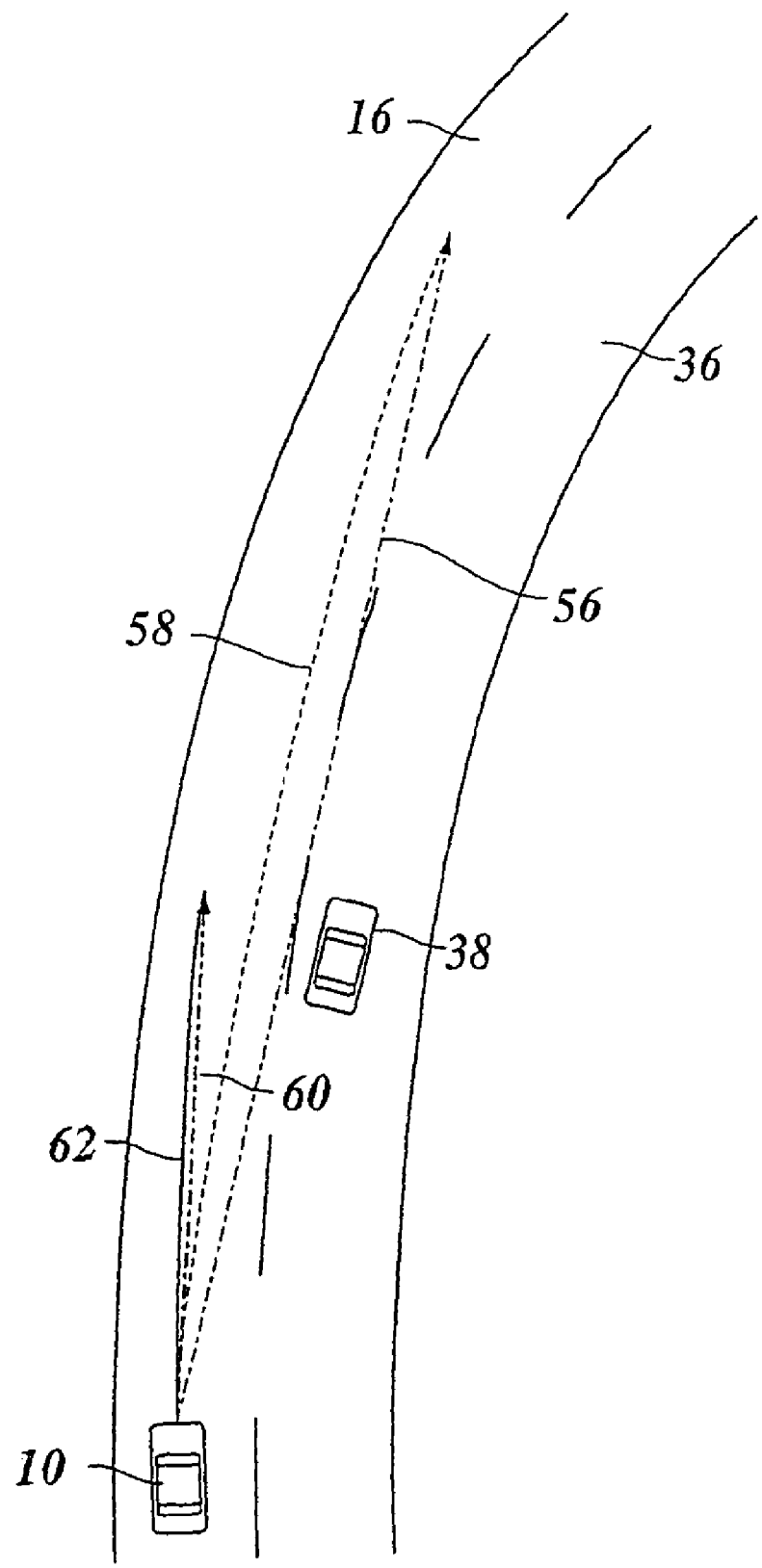
FIG. 6 shows a diagram illustrating the example method in negotiating turns.

With the example method described above it is possible to keep predicted time $T_v$ constant. When negotiating turns, however, it is expedient to vary the predicted time and the predicted distance accordingly, which is obtained by multiplying the predicted time by the absolute speed of vehicle 10. This is illustrated in FIG. 6, which shows vehicle 10 on a curved section of road. A dash-dot arrow 58 here indicates the predicted distance which results from regular predicted time $T_v$. This would yield a path 60 of vehicle 10, which is indicated by a thin dotted line in FIG. 6.

This shows that the long predicted time results in a certain cutting of the turn. If no object is present on neighboring lane 36 at the right, this cutting of the turn is quite acceptable. However, if there is an object 38 in the neighboring lane, there may be a problematical approach to this object even if the setpoint value has been offset laterally to the left because of the tracking of object 38. If an object in the inner neighboring lane is tracked in a turn, it is expedient to shorten the predicted time and thus also the predicted distance as indicated by an arrow 62 in FIG. 6. Resulting path 64 of vehicle 10 ensures that an adequate distance from object 38 will always be maintained.

The processing procedures necessary for the method according to the present invention may be performed by a microcomputer, for example, which fulfills the functions of selection device 26 and processing device 28 in FIG. 1. If no camera system is available for object recognition, the tracking data may also be obtained via radar sensor 40 or a comparable distance sensor, e.g., a lidar sensor. The size of the object tracked may then be estimated at least approximately on the basis of the dependence on the direction and/or the strength of the echo signal so that a distinction may be made at least between a truck 42 and a passenger vehicle 44. Standard values for the various object classes (passenger vehicle or truck) may be used as the basis for the length of the object which is needed for determining point in time $T_{pe}$. In the case of a truck, echo signals originating from reflections on the front fender or other structures of the truck may also be analyzed, if necessary. In a simplified embodiment, a constant, sufficiently great object length may always be used as the basis for calculations.

What is claimed is:

1. A method for lane keeping support in a motor vehicle, the method comprising:
   determining a setpoint value for a lateral position of the vehicle relative to a center of a lane in which the vehicle is traveling, wherein the determined setpoint value is such that the vehicle remains inside the lane when the position of the vehicle is controlled according to the setpoint value;
determining an actual position of the vehicle in relation to boundaries of the lane in which the vehicle is traveling, using a sensor device;
calculating an output signal for the lane keeping support by a setpoint-actual comparison;
controlling the position of the vehicle according to the setpoint value, using the output signal; and
tracking at least one object in at least one neighboring lane and varying the setpoint value, for the lateral position of the vehicle relative to the center of the lane, as a function of tracking data of the object, wherein the varied setpoint still keeps the vehicle inside the lane when the position of the vehicle is controlled according to the setpoint value;
wherein the determined setpoint value is a control parameter for providing control of the vehicle position;
wherein the setpoint value is calculated as a function of a normal value selectable by a driver and representing a lateral offset of the vehicle from a center of the lane in which the vehicle is traveling, as desired by the driver.

2. The method as recited in claim 1, wherein the tracking data includes a lateral distance of the object from a center of the lane in which the vehicle is traveling or from the lateral position of the vehicle, and wherein the setpoint value is varied by increasing the lateral distance when passing the object.

3. The method as recited in claim 1, wherein the tracking step includes analyzing a video image recorded by at least one video camera.

4. The method as recited in claim 1, further comprising:
acquiring the tracking data of the object using a distance sensor.

5. The method as recited in claim 4, wherein the distance sensor is one of a radar sensor or a lidar sensor.

6. The method as recited in claim 1, wherein an object in a neighboring lane on a right of the vehicle and an object in a neighboring lane on a left of the vehicle are tracked, one of the neighboring lanes on the right or left being a lane of oncoming traffic.

7. The method as recited in claim 1, wherein the tracking data includes at least one of an object distance in a longitudinal direction of the lane in which the vehicle is traveling, an absolute or relative speed of the object, and a size of the object, and wherein the setpoint value is calculated taking into account at least one of the tracking data.

8. The method as recited in claim 1, further comprising:
dynamically varying at least one of parameters which determine a dependence of the setpoint value on the tracking data by a self-learning system as a function of correcting measures taken by the driver in steering.

9. The method as recited in claim 1, wherein the output signal is calculated in such a way that the actual position is regulated at the setpoint value within a fixedly or variably selectable predicted time.

10. The method as recited in claim 9, wherein points in time at which the vehicle will pass the object are calculated in advance based on measured relative speeds of the object, and the tracking data of the passed objects after the predicted time has elapsed is used for calculation of the setpoint value.

11. The method as recited in claim 10, wherein the predicted time is reduced while the object is being passed in passing maneuvers.

12. The method as recited in claim 11, wherein the predicted time is reduced in curves.

13. A device for lane keeping support in a motor vehicle, comprising:
a device configured to determine a setpoint value for a lateral position of the vehicle relative to a center of a lane in which the vehicle is traveling, wherein the determined setpoint value is such that the vehicle remains inside the lane when the position of the vehicle is controlled according to the setpoint value;
a sensor device configured to detect an actual position of the vehicle in relation to boundaries of the lane in which the vehicle is traveling;
a comparator device to calculate an output signal for the lane keeping support by a setpoint value-actual comparison;
a control device to control the position of the vehicle according to the setpoint value, using the output signal;
a tracking system configured to track objects in at least one neighboring lane; and a device to vary the setpoint value, for the lateral position of the vehicle relative to the center of the lane, as a function of the tracking data of these objects, wherein the varied setpoint still keeps the vehicle inside the lane when the position of the vehicle is controlled according to the setpoint value;
wherein the determined setpoint value is a control parameter for providing control of the vehicle position;
wherein the setpoint value is calculated as a function of a normal value selectable by a driver and representing a lateral offset of the vehicle from a center of the lane in which the vehicle is traveling, as desired by the driver.

14. The method of claim 1, wherein the object is a second vehicle moving in the at least one neighboring lane.

15. The method of claim 14, wherein the tracking data includes the size of the second vehicle moving in the at least one neighboring lane, and the varying of the setpoint value includes varying the setpoint value as a function of the size of the second vehicle moving in the at least one neighboring lane.

16. The method of claim 14, wherein the setpoint value has a first magnitude prior to the vehicle passing the second vehicle when the vehicle is not within a predetermined longitudinal distance of the second vehicle, and wherein the setpoint value is varied to a second magnitude as a function of the tracking data when the vehicle is within the predetermined longitudinal distance from the second vehicle, and
further comprising returning the setpoint value to the first magnitude after the vehicle has passed the second vehicle and the vehicle is again not within the predetermined longitudinal distance from the second vehicle.

17. The method of claim 6, wherein the object in the neighboring lane on the right of the vehicle is a second vehicle and the object in the neighboring lane on the left of the vehicle is a third vehicle, and the setpoint value is varied as a function of the tracking data of both the second and third vehicles.

18. The method of claim 17, wherein the setpoint value is varied as a function of an average of a first setpoint value and a second setpoint value, the first setpoint value calculated as a function of the tracking data of the second vehicle, and the second setpoint value calculated as a function of the tracking data of the third vehicle.

* * * * *